United States Patent
Byun

(10) Patent No.: US 10,466,929 B2
(45) Date of Patent: Nov. 5, 2019

(54) MEMORY SYSTEM USING PHYSICAL TO LOGICAL MAP DATA AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 23 days.

(21) Appl. No.: 15/434,305

(22) Filed: Feb. 16, 2017

(65) Prior Publication Data
US 2018/0004439 A1    Jan. 4, 2018

(30) Foreign Application Priority Data

Jun. 30, 2016    (KR) .................. 10-2016-0082818

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/064* (2013.01); *G06F 3/0679* (2013.01); *G06F 12/0246* (2013.01); *G06F 2212/1024* (2013.01); *G06F 2212/7203* (2013.01)

(58) Field of Classification Search
CPC ...... G06F 12/0246; G06F 3/067; G06F 3/064; G06F 3/0608; G06F 17/30091; G06F 3/0683
See application file for complete search history.

(56) References Cited

U.S. PATENT DOCUMENTS

| | | | |
|---|---|---|---|
| 6,377,500 B1* | 4/2002 | Fujimoto | G06F 12/0246 365/230.01 |
| 8,370,567 B1* | 2/2013 | Bonwick | G06F 3/0688 711/103 |
| 9,239,782 B2 | 1/2016 | Yang | |
| 2003/0163635 A1* | 8/2003 | Aasheim | G06F 3/0619 711/103 |
| 2010/0070735 A1* | 3/2010 | Chen | G06F 12/0246 711/206 |
| 2015/0127887 A1 | 5/2015 | Kim et al. | |

FOREIGN PATENT DOCUMENTS

KR    1020150130638    11/2015

\* cited by examiner

*Primary Examiner* — Charles Rones
*Assistant Examiner* — Jonah C Krieger
(74) *Attorney, Agent, or Firm* — IP & T Group LLP

(57) ABSTRACT

A memory system may include: a memory device including a plurality of memory blocks, each memory block including a plurality of pages, each page including a plurality of memory cells operatively coupled to a word line for storing data; and a controller including a memory, the controller being suitable for performing a command operation corresponding to a command received from a host, storing data segments of user data and meta segments of metadata for the its command operation in the memory, storing the data segments in first pages included in a first memory block among the memory blocks, storing the meta segments in second pages included in the first memory block, and storing segment informations for the meta segments, in spare regions of the second pages.

18 Claims, 9 Drawing Sheets

MEMORY SYSTEM USING PHYSICAL TO LOGICAL MAP DATA AND OPERATING METHOD THEREOF

CROSS-REFERENCE TO RELATED APPLICATION

This U.S. non-provisional patent application claims priority under 35 U.S.C. § 119(a) to Korean Patent Application No. 10-2016-0082818 filed on Jun. 30, 2016 in the Korean Intellectual Property Office (KIPO), the disclosure of which is incorporated herein by reference in its entirety.

TECHNICAL FIELD

Exemplary embodiments of the present invention relate to a memory system which processes data with respect to a memory device, and an operating method thereof.

DISCUSSION OF THE RELATED ART

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. The memory system may be used as a main memory device or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an exemplary embodiment of the present invention, a memory system may include: a memory device including a plurality of memory blocks, each memory block including a plurality of pages, each page including a plurality of memory cells operatively coupled to a word line for storing data; and a controller including a memory, the controller being suitable for performing a command operation corresponding to a command received from a host, storing data segments of user data and meta segments of metadata for the command operation in the memory, storing the data segments in first pages included in a first memory block among the memory blocks, storing the meta segments in second pages included in the first memory block, and storing segment informations for the meta segments, in spare regions of the second pages.

The controller may store a first data segment among the data segments, in a third page among the first pages, and stores a first meta segment for the first data segment among the meta segments, in a fourth page next to the third page, among the second pages.

The controller may store a second data segment among the data segments, in a fifth page next to the fourth page, and stores a second meta segment for the second data segment among the meta segments, in a sixth page next to the fifth page.

The controller may store a first segment information for the first meta segment, in a first spare region of the sixth page, among the spare regions.

While storing the second meta segment in the sixth page, if a power-off occurs in the memory system and then the memory system is changed to a power-on state, the controller may store the second meta segment in a seventh page next to the sixth page.

While storing the second data segment in the fifth page, if a power-off occurs in the memory system and then the memory system is changed to a power-on state, the controller may store the second data segment in the sixth page and may store the second meta segment in the seventh page next to the sixth page.

Segment links may be formed between the meta segments stored in the second pages, through the segment information stored in the spare regions of the second pages.

The controller may sequentially check the meta segments through the segment links.

The segment information may be position information of the second pages in which the meta segments are stored.

The second pages may serve as checkpoints indicating that the data segments are completely stored in the first pages.

In an exemplary embodiment of the present invention, a method for operating a memory system may include: receiving a command from a host for a plurality of pages which are included in each of a plurality of memory blocks of a memory device of the memory system; performing a command operation corresponding to the command, between a controller of the memory device and the memory blocks; storing data segments of user data and meta segments of metadata for the command operation, in a memory of the controller; storing the data segments in first pages included in a first memory block among the memory blocks; and storing the meta segments in second pages included in the first memory block, and storing segment informations for the meta segments, in spare regions of the second pages.

The storing in the first pages may include: storing a first data segment among the data segments, in a third page among the first pages, and the storing in the second pages may include: storing a first meta segment for the first data segment among the meta segments, in a fourth page next to the third page, among the second pages.

The storing in the first pages may include: storing a second data segment among the data segments, in a fifth page next to the fourth page, and the storing in the second pages may include: storing a second meta segment for the second data segment among the meta segments, in a sixth page next to the fifth page.

The storing in the spare regions may include: storing a first segment information for the first meta segment, in a first spare region of the sixth page, among the spare regions.

The method may further include: storing the second meta segment in a seventh page next to the sixth page, if a power-off occurs in the memory system while storing the second meta segment in the sixth page and then the memory system is changed to a power-on state.

The method may further include: storing the second data segment in the sixth page and storing the second meta segment in the seventh page next to the sixth page, if a power-off occurs in the memory system while storing the second data segment in the fifth page and then the memory system is changed to a power-on state.

Segment links may be formed between the meta segments stored in the second pages, through the segment information stored in the spare regions of the second pages.

The method may further include: sequentially checking the meta segments through the segment links.

The segment information may be position information of the second pages in which the meta segments are stored.

The second pages may serve as checkpoints indicating that the data segments are completely stored in the first pages.

In an exemplary embodiment of the present invention, a method for operating a memory system may include: providing a memory device and a controller operatively coupled to the memory device, the memory device includes a plurality of pages; storing a first data segment of user data in a first page; storing a first meta segment for the first data segment in a second page; storing a second data segment of the user data in a third page; storing a second meta segment for the second data segment in a fourth page; and storing a first segment information for the first meta segment, in a first spare region of the fourth page, wherein each of the plurality of pages includes a plurality of memory cells operatively coupled with a plurality of word lines.

A third data segment of the user data may be stored in a fifth page. A third meta segment for the third data segment may be stored in a sixth page. A second segment information for the second meta segment may be stored in a second spare region of the sixth page.

BRIEF DESCRIPTION OF THE DRAWINGS

These and other features and advantages of the present invention will become apparent to persons skilled in the art to which this invention pertains from the following detailed description in reference to the accompanying drawings, wherein.

DETAILED DESCRIPTION

Figure 1:
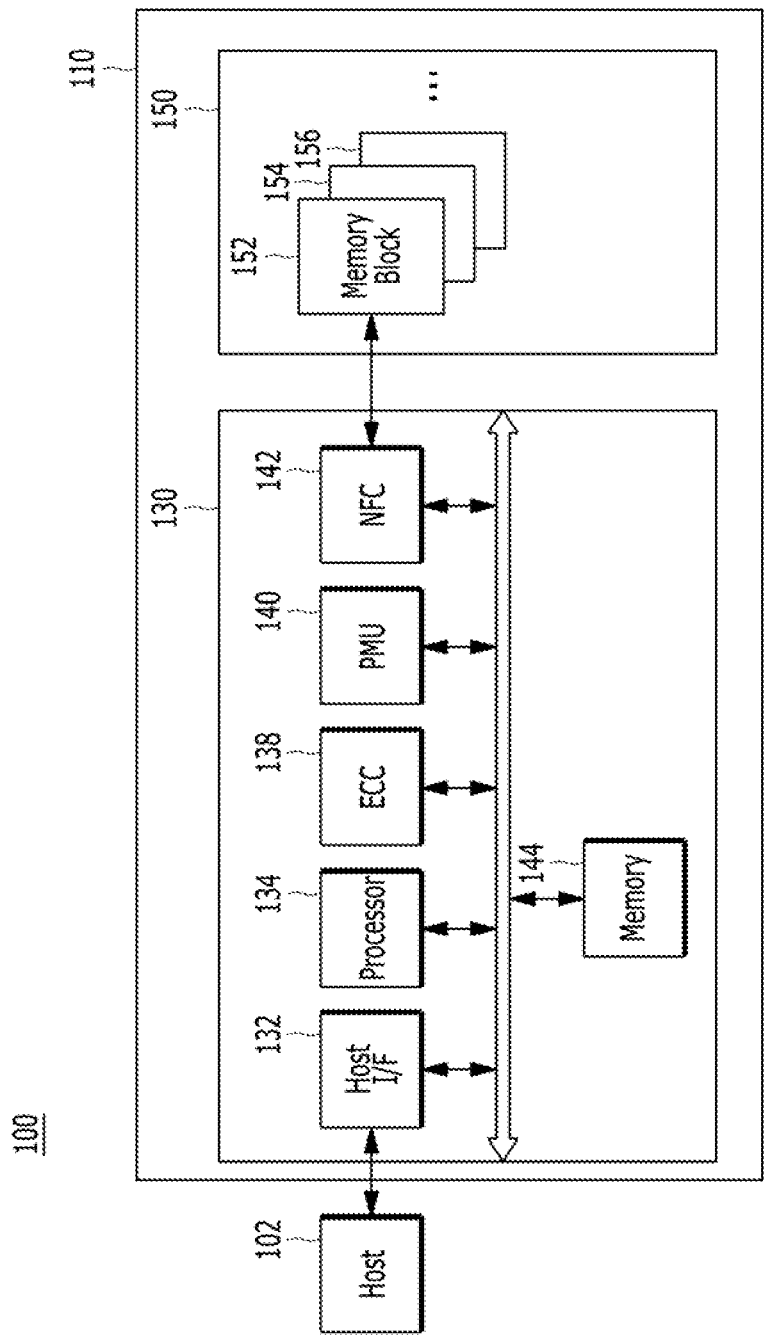
FIG. 1 is a diagram illustrating a data processing system including a memory system coupled to a host, according to an embodiment of the present invention.

Although, various embodiments are described below in more detail with reference to the accompanying drawings, we note that the present invention may, however, be embodied in different forms and should not be construed as being limited only to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

We further note that in the following description, numerous specific details are set forth in for providing a thorough understanding of the present invention. However, as would be apparent to those skilled in the relevant art, the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described with reference to the attached drawings.

FIG. 1 illustrates a data processing system 100 including a memory system 110, according to an embodiment of the present invention.

Referring to FIG. 1, a data processing system 100 may include a host 102 operatively coupled to a memory system 110.

The host 102 may include, for example, a portable electronic device such as a mobile phone, an MP3 player and a laptop computer or a non-portable electronic device such as a desktop computer, a game player, a TV and a projector.

The memory system 110 may operate in response to a request received from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM), and a flash memory.

The memory system 110 may include a memory device 150 for storing data to be accessed by the host 102, and a controller 130 operatively coupled to the memory device 150 for controlling the storage of data in the memory device 150 and the transfer of stored data from the memory device to the host.

The controller 130 and the memory device 150 may be integrated into a single semiconductor device. For instance, the controller 130 and the memory device 150 may be integrated into a single semiconductor device configured as a solid state drive (SSD).

When the memory system 110 is used as the SSD, the operation speed of the host 102 that is electrically coupled with the memory system 110 may be significantly increased.

The controller 130 and the memory device 150 may be integrated into a single semiconductor device configured as a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply to the device is interrupted and, in particular, store the data provided from the host 102 during a write operation, and provide stored data to the host 102 during a read operation. The memory device 150 may include a plurality of memory blocks, for example, memory blocks 152, 154 and 156. Each of the memory blocks 152, 154 and 156 may include a plurality of pages. Each of the pages may include a plurality of memory cells coupled to a word line (WL). The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later.

The controller 130 of the memory system 110 may control the memory device 150 in response to a request from the host 102. For example, upon receiving a read request from the host 102 the controller 130 may issue a read command and an address to the memory device for reading the data which are stored in the requested address in the memory device and may provide the data read from the memory device 150, to the host 102. Also, in response to a program request (also referred to as a write request) received from the host 102, the controller 130 may issue a write command, an address and write data and may control the operation of the memory device for storing the write data into the memory device 150. The write data are provided from the host 102 to the memory controller together with the write request. To this end, the controller 130 may control one or more operations of the memory device 150 including, for example, a read operation, a write operation and an erase operation. The controller 130 may also control one or more background operations of the memory device 150.

In the illustrated embodiment of FIG. 1, the controller 130 includes a host interface unit 132, a processor 134, an error correction code (ECC) unit 138, a power management unit (PMU) 140, a NAND flash controller (NFC) 142, and a memory 144.

The host interface unit 132 provides an interface between the host and the controller 130. For example, the host interface 132 may receive and process requests, addresses and data provided from the host 102. The host interface may also transmit read data from the memory device to the host. The host interface 132 may communicate with the host 102 through at least one of various well-known interface protocols such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 includes a flash memory and, in particular, when the memory device 150 includes a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read operation, write operation, program operation and erase operation.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
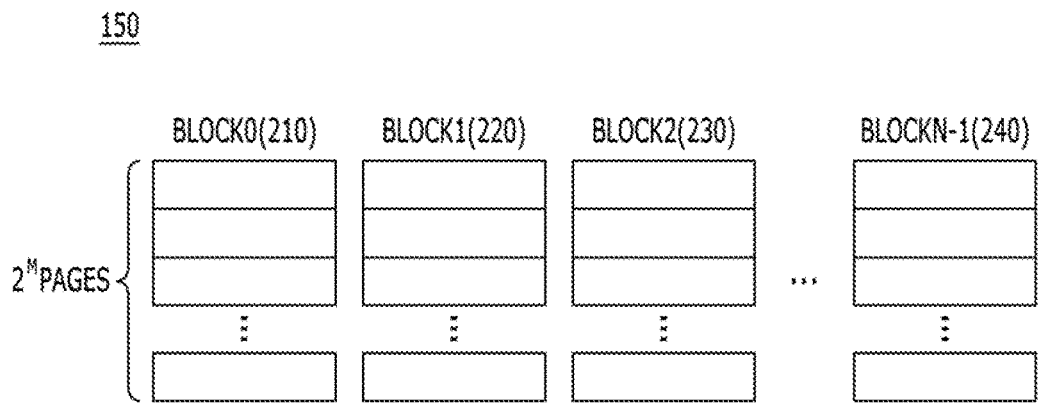
FIG. 2 is a diagram illustrating a configuration example of a memory device employed in the memory system of FIG. 1.

FIG. 2 is a schematic diagram illustrating the memory device 150 of FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. The MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
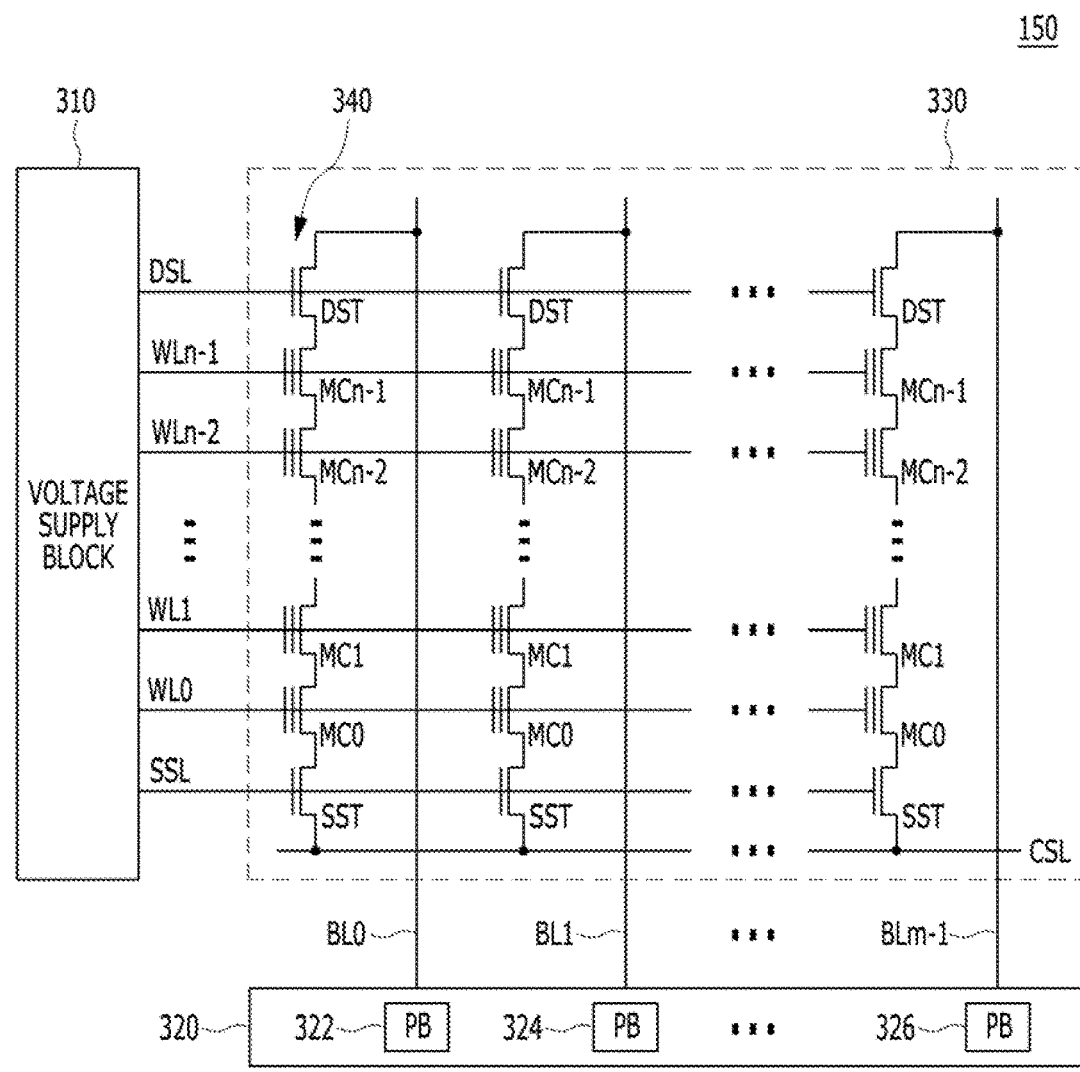
FIG. 3 is a diagram schematically illustrating a memory cell array circuit of a memory block in a memory device, according to an embodiment of the present invention.

FIG. 3 is a circuit diagram illustrating an example of a memory block in a memory device.

Referring to FIG. 3, a memory block 150 of a memory device 300 may include a plurality of cell strings 340 which are realized into a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors DST and SST. The respective memory cells MC0 to MCn−1 may be constructed by multi-level cells (MLC) each of which stores a data information of a plurality of bits. The cell strings 340 may be electrically coupled to corresponding bit lines BL0 to BLm−1, respectively. For reference, in FIG. 3, 'DSL' may denote a drain select line, 'SSL' may denote a source select line, and 'CSL' may denote a common source line.

While FIG. 3 shows, as an example, the memory block 330 which is constructed by NAND flash memory cells, it is to be noted that the memory block 330 of the memory device 150 according to the embodiment is not limited to a NAND flash memory and may be realized by a NOR flash memory, a hybrid flash memory in which at least two kinds of memory cells are combined or a one-NAND flash memory in which a controller is built in a memory chip. The operational characteristics of a semiconductor device may be applied to not only a flash memory device in which a charge storing layer is constructed by conductive floating gates but also a charge trap flash (CTF) in which a charge storing layer is constructed by a dielectric layer.

A voltage supply block 310 of the memory device 150 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 150 is controlled by the control circuit, and may operate as a sense amplifier or a write driver according to an operation mode. For example, in the case of a verify/normal read operation, the read/write circuit 320 may operate as a sense amplifier for reading data from the memory cell array. Also, in the case of a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

Figure 4:
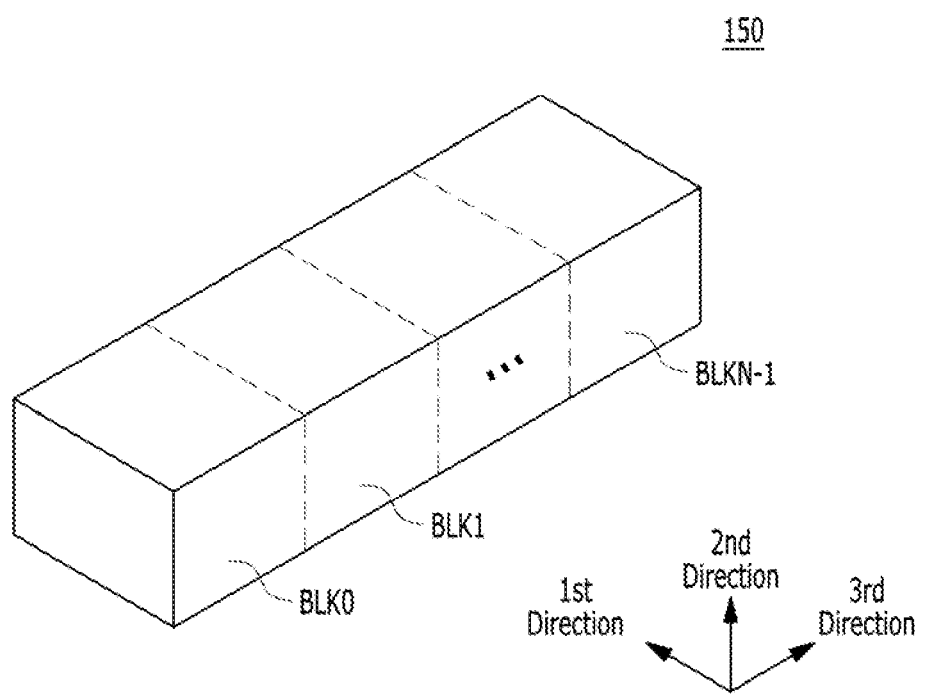
FIG. 4 is a diagram schematically illustrating a 3-D configuration of a memory device, according to an embodiment of the present invention.

Also, the memory device 150 may be realized as a 2-dimensional or 3-dimensional memory device. As shown in FIG. 4, in the case where the memory device 150 is realized as a 3-dimensional nonvolatile memory device, the memory device 150 may include a plurality of memory blocks BLK0 to BLKN−1.

FIG. 4 is a block diagram illustrating the memory blocks of the memory device shown in FIG. 2, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions, for example, the x-axis direction, the y-axis direction and the z-axis direction.

The respective memory blocks BLK0 to BLKN−1 included in the memory device 150 may include a plurality of NAND strings which extend in the second direction. The plurality of NAND strings may be provided in the first direction and the third direction. Each NAND string may be coupled to a bit line, at least one string select line, at least one ground select line, a plurality of word lines, at least one dummy word line and a common source line, and may include a plurality of transistor structures.

Namely, among the plurality of memory blocks BLK0 to BLKN−1 of the memory device 150, the respective memory blocks BLK0 to BLKN−1 may be coupled to a plurality of bit lines, a plurality of string select lines, a plurality of ground select lines, a plurality of word lines, a plurality of dummy word lines and a plurality of common source lines, and accordingly, may include a plurality of NAND strings. Also, in the respective memory blocks BLK0 to BLKN−1, a plurality of NAND strings may be coupled to one bit line, and a plurality of transistors may be realized in one NAND string. A string select transistor of each NAND string may be coupled to a corresponding bit line, and a ground select transistor of each NAND string may be coupled to the common source line. Memory cells may be provided between the string select transistor and the ground select transistor of each NAND string. Namely, in the plurality of memory blocks BLK0 to BLKN−1 of the memory device 150, a plurality of memory cells may be realized in each of the memory blocks BLK0 to BLKN−1.

Hereinbelow, detailed descriptions will be made with reference to FIGS. 5 to 7, for data processing with respect to a memory device 150 in a memory system according to an embodiment of the present invention. Particularly, a command data processing operation corresponding to a command received from the host 102 with respect to the memory device 150 will be described.

Figure 5:
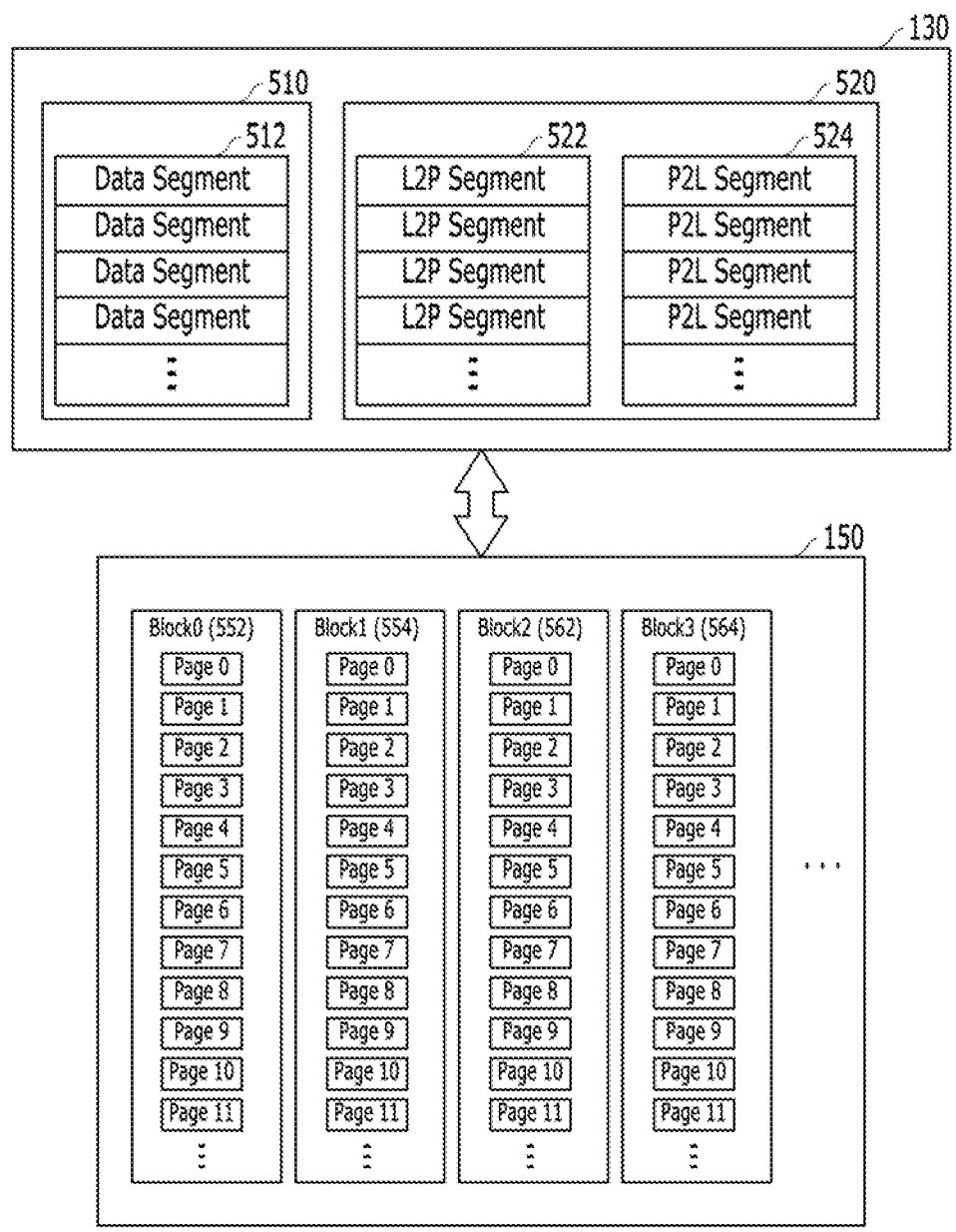
FIGS. 5 and 6 are diagrams to assist in the explanation of a data processing operation with respect to a memory device in a memory system in according to an embodiment of the present invention.
Figure 6:
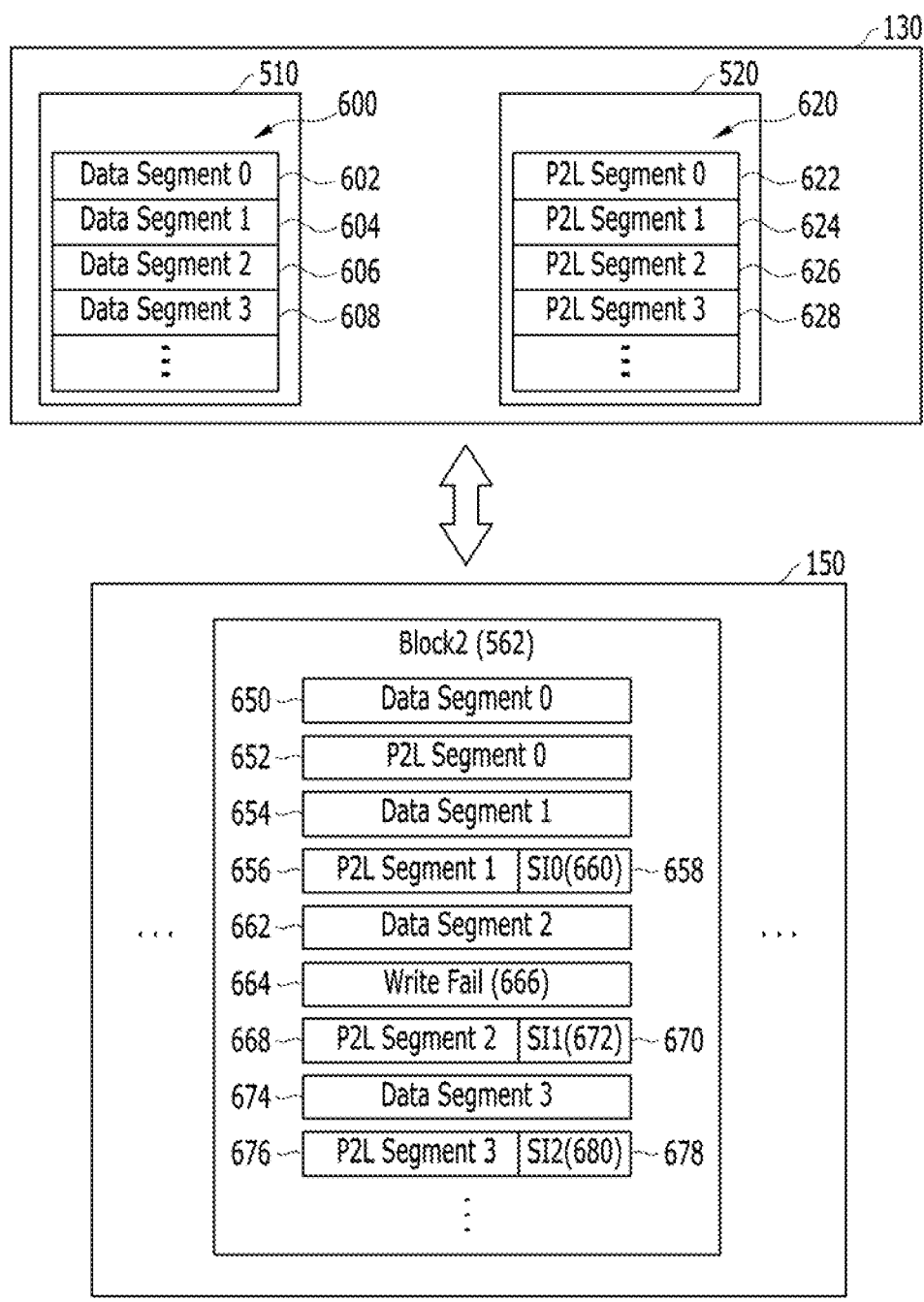

FIGS. 5 and 6 are diagrams to assist in the explanation of a data processing operation with respect to the memory device 150 in the memory system 110 of FIG. 1 according to an embodiment of the present invention. A data processing operation in the memory system 110 shown in FIG. 1 may include first storing command data corresponding to a command received from the host 102 in a buffer/cache included in the memory 144 of the controller 130, and then performing a command operation corresponding to the received command. For example, the command may be a write command, in which case the command data are write data received together with the write command. In the case wherein the received command is a write command, performing the write command includes writing (i.e., programming) the write data which are stored in the buffer/cache in at least one of the plurality of memory blocks included in the memory device 150. Then, the data which are programmed in the memory device 150 are updated and reprogrammed in the memory device 150. The write data may include user data and metadata.

The controller 130 may perform the data processing operation in the memory system 110. For example, the processor 134 included in the controller 130 may perform the data processing through, for example, an FTL (flash translation layer). For example, the controller 130 first stores the write data corresponding to a received write command in the buffer included in the memory 144 of the controller 130. The write data may include user data and metadata corresponding to the write command received from the host 102. Then after storing the write data in the buffer of the memory 144, the controller 130 writes and stores the write data stored in the buffer, in at least one of the plurality of memory blocks included in the memory device 150.

The metadata may include all remaining information and data excluding the user data corresponding to the command received from the host 102. For example, the metadata may include first map data including a logical/physical (L2P: logical to physical) information (hereinafter, referred to as a 'logical information') and second map data including a physical/logical (P2L: physical to logical) information (hereinafter, referred to as a 'physical information'), for the data stored in the memory blocks in correspondence to the program operation.

Also, the metadata may include an information on the command data corresponding to the command received from the host 102, an information on the command operation corresponding to the command received from the host 102, an information on the at least one memory block of the memory device 150 for which the command operation is to be performed, and an information on map data corresponding to the command operation.

In an embodiment when the controller 130 receives a command, for example, a write command, from the host 102, the user data corresponding to the write command are written and stored in at least one first memory block of the memory device 150. For example, the user data may be written and stored in at least one open memory block or a free memory block. An open memory block is a memory block having only a first part of its memory that is written with data and a second part of its memory that is empty. A free memory block is one that has all of its memory empty. A free memory block may be, for example, a memory block that has been subjected to an erase operation. Metadata for the user data are written and stored in at least one second memory block. The at least one first and second memory blocks may be the same or different. The metadata may include a mapping information between logical addresses and physical addresses for the user data stored in the at least one first memory block, that is, first map data including an L2P map table in which logical information are recorded, and a mapping information between physical addresses and logical addresses for the at least one memory block in which the user data are stored, that is, second map data including a P2L map table in which physical information are recorded, the metadata being written and stored in the at least second memory block. The at least second memory block may be an open memory blocks or a free memory block among the memory blocks of the memory device 150. The at least second memory block may be the same or different to the at least first memory block.

In an embodiment of the present disclosure, when a write command is received from the host 102, user data corresponding to the write command are written and stored in a plurality of first memory blocks, and metadata including the first map data and the second map data for the user data stored in the plurality of first memory blocks are stored in a plurality of second memory blocks. At this time, data segments of the user data and meta segments of the metadata, that is, L2P segments of the first map data and P2L segments of the second map data as map segments of map data, may be stored in the plurality of second memory blocks of the memory device 150. After the controller 130 stores the data segments of the user data and the meta segments of the metadata in the memory 144 included in the controller 130, the controller 130 stores the data segments of the user data and the meta segments of the metadata in the plurality of the first and second memory blocks of the memory device 150. In particular, as the data segments of the user data are stored in the plurality of the first memory blocks of the memory device 150, the controller 130 generates and updates meta segments and stores the updated meta segments in the plurality of the second memory blocks of the memory device 150. The plurality of first and second memory blocks may be the same or may be different and may be open or free memory blocks. When the plurality of the first and second memory blocks are different the memory blocks of the memory device 150 are divided into data memory blocks and metadata memory blocks.

Hereinbelow, a data processing operation in the memory system according to an embodiment will be described in reference to FIGS. 5 and 6.

First, referring to FIG. 5, the controller 130 writes and stores data corresponding to a command received from the host 102, for example, user data corresponding to a write command, in memory blocks 552, 554, 562 and 564 of the memory device 150. Also, in correspondence to the write operation to the memory blocks 552, 554, 562 and 564, the controller 130 generates and updates metadata for the user data and writes and stores the metadata in the memory blocks 552, 554, 562 and 564 of the memory device 150.

The controller 130 may generate and update information indicating that the user data are stored in the pages included in the memory blocks 552, 554, 562 and 564 of the memory device 150, for example, first map data and second map data, that is, generate and update the logical segments of the first map data, that is, L2P segments, and the physical segments of the second map data, that is, P2L segments, and then, write and store the L2P segments and the P2L segments in the memory blocks 552, 554, 562 and 564 of the memory device 150.

For example, the controller 130 may cache and buffer the user data corresponding to the write command received from the host 102, in a first buffer 510 included in the memory 144 of the controller 130, that is, stores data segments 512 of the user data in the first buffer 510 as a data buffer/cache. Then, the controller 130 may write and store the data segments 512 stored in the first buffer 510, in the pages included in the memory blocks 552, 554, 562 and 564 of the memory device 150.

As the data segments 512 of the user data corresponding to the write command received from the host 102 are written and stored in the pages included in the memory blocks 552, 554, 562 and 564 of the memory device 150, the controller 130 may generate the first map data and the second map data, and store the first map data and the second map data in a second buffer 520 included in the memory 144 of the controller 130. Namely, the controller 130 may store L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data.

The controller 130 may write and store the L2P segments 522 of the first map data and the P2L segments 524 of the second map data which are stored in the second buffer 520, in the pages included in the memory blocks 552, 554, 562 and 564 of the memory device 150. While it will be exemplarily described in the embodiment of the present disclosure, for the sake of convenience in explanation, that the data segments 512 and the L2P segments 522 of the first map data and the P2L segments 524 of the second map data are stored in the same optional memory blocks among the memory blocks 552, 554, 562 and 564 of the memory device 150, without being divided into data memory blocks and map memory blocks, it is to be noted that they may be stored in different memory blocks among the memory blocks 552, 554, 562 and 564 of the memory device 150. That is to say, after dividing the memory blocks 552, 554, 562 and 564 into data memory blocks and map memory blocks, the data segments 512 may be stored in the data memory blocks, and the L2P segments 522 of the first map data and the P2L segments 524 of the second map data may be stored in the map memory blocks.

The memory device 150 may include a plurality of memory dies, and each of the memory dies included in the memory device 150 may include a plurality of planes. Further, each plane of the memory device 150 may include the plurality of memory blocks 552, 554, 562 and 564, for example, N number of blocks Block0, Block1, . . . and BlockN−1 each including a plurality of pages, for example, $2^M$ number of pages, as described above with reference to FIG. 2. Hereinbelow, detailed descriptions will be made with reference to FIG. 6, for an operation of writing and storing the user data and the metadata corresponding to the write command received from the host 102, in the plurality of memory blocks included in the memory device 150, in the memory system according to an embodiment.

Referring to FIG. 6, the controller 130 may write and store data corresponding to a command received from the host 102, for example, user data corresponding to a write command, in the memory block 2 562 among the memory blocks 552, 554, 562 and 564 of the memory device 150. In correspondence to the write operation to the memory block 2 562, the controller 130 may generate and update metadata for the user data and write and store the metadata in the memory block 2 562 among the memory blocks 552, 554, 562 and 564 of the memory device 150.

The controller 130 may generate and update information indicating that the user data are stored in the memory block 2 562 among the memory blocks 552, 554, 562 and 564 of the memory device 150, for example, first map data and second map data, that is, generate and update the logical segments of the first map data, that is, L2P segments, and the physical segments of the second map data, that is, P2L segments, and then, write and store the L2P segments and the P2L segments in the pages included in the memory block 2 562 of the memory device 150.

In other words, the controller 130 may cache and buffer the user data corresponding to the write command received from the host 102, in the first buffer 510 included in the memory 144 of the controller 130, that is, store data segments 600 of the user data in the first buffer 510 as a data buffer/cache. Then, the controller 130 may write and store the data segments 600 stored in the first buffer 510, in the pages included in the memory block 2 562 of the memory device 150.

As the data segments 600 of the user data corresponding to the write command received from the host 102 are written and stored in the pages included in the memory block 2 562 of the memory device 150, the controller 130 may generate the metadata, and store the metadata in the second buffer 520 included in the memory 144 of the controller 130. Namely, the controller 130 may generate the first map data and the second map data for the data segments 600 of the user data corresponding to the write command, and store the first map data and the second map data in the second buffer 520. In particular, the controller 130 may store P2L segments 620 of the second map data for the data segments 600 of the user data, in the second buffer 520 as a map buffer/cache. In the second buffer 520 in the memory 144 of the controller 130, there may be stored, as described above, the L2P segments of the first map data and the P2L segments 620 of the second map data, or there may be stored a map list for the L2P segments of the first map data and a map list for the P2L segments 620 of the second map data.

The controller 130 may write and store the meta segments of the metadata stored in the second buffer 520, in particular, the P2L segments 620 of the second map data, in the pages included in the memory block 2 562 of the memory device 150. The controller 130 may write and store segment information (SI) for the meta segments stored in the memory block 2 562 of the memory device 150, in particular, the P2L segments 620, in spare regions of pages in which the meta segments, in particular, the P2L segments 620 of the second map data are stored. In the segment information, there may be included information on positions where the meta segments, in particular, the P2L segments 620, are stored in the memory block 2 562 of the memory device 150. The controller 130 may manage the positions where the meta segments, in particular, the P2L segments 620, are stored in the memory block 2 562 of the memory device 150, through the segment information stored in spare regions in the memory block 2 562, in particular, the spare regions of the pages where the P2L segments 620 are stored, among the pages of the memory block 2 562. By checking the segment information stored in the spare regions, the controller 130 may easily check the meta segments stored in the memory block 2 562, in particular, the P2L segments 620.

When making detailed descriptions by taking an example, the controller 130 may store the data segments 600 of the user data corresponding to the write command received from the host 102, that is, a data segment 0 602, a data segment 1 604, a data segment 2 606 and a data segment 3 608, in the first buffer 510 included in the memory 144 of the controller 130. The controller 130 may write and store the data segments 600 stored in the first buffer 510, in the pages included in the memory block 2 562 of the memory device 150.

Namely, the controller 130 may write and store the data segment 0 602 stored in the first buffer 510, in a page 0 650 included in the memory block 2 562. The controller 130 may generate and update a meta segment 0 of the metadata corresponding to the storage of the data segment 0 602 in the page 0 650 of the memory block 2 562, that is, the meta segment 0 for the data segment 0 602, and store the meta segment 0 in the second buffer 520 included in the memory 144 of the controller 130. In particular, the controller 130 may generate and update a P2L segment 0 622 for the data segment 0 602, and store the P2L segment 0 622 in the second buffer 520. The controller 130 may write and store the P2L segment 0 622 stored in the second buffer 520, in a page 1 652 included in the memory block 2 562.

The P2L segment 0 622 for the data segment 0 602 is stored, in the memory block 2 562, in the next page of the page 0 650 in which the data segment 0 602 is stored, that is, the page 1 652. Therefore, the page 1 652 in which the P2L segment 0 622 is stored serves as a checkpoint indicating that the data segment 0 602 is completely stored in the memory block 2 562 of the memory device 150. The controller 130 may check, through the page 1 652 in which the P2L segment 0 622 is stored, that a write or program operation for the data segment 0 602 is normally completed, that is, a write success for the data segment 0 602.

The controller 130 may write and store the data segment 1 604 stored in the first buffer 510, in a page 2 654 included in the memory block 2 562. The controller 130 may generate and update a meta segment 1 of the metadata corresponding to the storage of the data segment 1 604 in the page 2 654 of the memory block 2 562, that is, the meta segment 1 for the data segment 1 604, and store the meta segment 1 in the second buffer 520 included in the memory 144 of the controller 130. In particular, the controller 130 may generate and update a P2L segment 1 624 for the data segment 1 604, and stores the P2L segment 1 624 in the second buffer 520. The controller 130 may write and store the P2L segment 1 624 stored in the second buffer 520, in a page 3 656 included in the memory block 2 562.

The controller 130 may write and store, in a spare region 0 658 in the page 3 656 of the memory block 2 562 in which the P2L segment 1 624 is stored, a segment information 0 660 for the meta segment 0 of the metadata stored in the memory block 2 562, in particular, the segment information 0 660 for the P2L segment 0 622 stored in the page 1 652 of the memory block 2 562. As described above, as an information on a position where the P2L segment 0 622 is stored, that is, the address information of the page 1 652 as a position information for the page 1 652 of the memory block 2 562, is included in the segment information 0 660 which is stored in the spare region 0 658 of the memory block 2 562, the controller 130 may manage the position information of the P2L segment 0 622 stored in the page 1

652 of the memory block 2 562, through the segment information 0 660 stored in the spare region 0 658 of the page 3 656. Also, by checking the segment information 0 660 stored in the spare region 0 658, the controller 130 may easily check the P2L segment 0 622 stored in the page 1 652 of the memory block 2 562. In particular, as a segment link may be formed between the P2L segment 0 622 stored in the page 1 652 of the memory block 2 562 and the P2L segment 1 624 stored in the page 3 656 of the memory block 2 562 through the spare region 0 658 of the page 3 656, the controller 130 may easily manage and checks the P2L segments 620 stored in the memory block 2 562. That is to say, the controller 130 may easily manage and check the meta segments of the metadata stored in the memory device 150, in particular, the P2L segments 620, through the segment link.

The P2L segment 1 624 for the data segment 1 604 may be stored, in the memory block 2 562, in the next page of the page 2 654 in which the data segment 1 604 is stored, that is, the page 3 656. Therefore, the page 3 656 in which the P2L segment 1 624 is stored may serve as a checkpoint indicating that the data segment 1 604 is completely stored in the memory block 2 562 of the memory device 150. The controller 130 may check, through the page 3 656 in which the P2L segment 1 624 is stored, that a write or program operation for the data segment 1 604 is normally completed, that is, a write success for the data segment 1 604.

The controller 130 may write and store the data segment 2 606 stored in the first buffer 510, in a page 4 662 included in the memory block 2 562. The controller 130 may generate and update a meta segment 2 of the metadata corresponding to the storage of the data segment 2 606 in the page 4 662 of the memory block 2 562, that is, the meta segment 2 for the data segment 2 606, and store the meta segment 2 in the second buffer 520 included in the memory 144 of the controller 130. In particular, the controller 130 may generate and update a P2L segment 2 626 for the data segment 2 606, and store the P2L segment 2 626 in the second buffer 520. The controller 130 may write and store the P2L segment 2 626 stored in the second buffer 520, in a page 5 664 included in the memory block 2 562.

In the case where the memory system 110 is changed from a power-on state to a power-off state, in particular, in the case where a sudden power-off occurs while the P2L segment 2 626 stored in the second buffer 520 is written in the page 5 664 of the memory block 2 562, the controller 130 may check a write fail 666 of the P2L segment 2 626 with respect to the page 5 664 of the memory block 2 562 when the memory system 110 is changed from the power-off state to a power-on state, and write and store the P2L segment 2 626 stored in the second buffer 520, in the next page of the page 5 664 in which the write fail 666 occurs, that is, a page 6 668 of the memory block 2 562. In the case where a sudden power-off occurs while writing the data segment 2 606 stored in the first buffer 510, in the page 4 662 included in the memory block 2 562, the controller 130 may check a write fail of the data segment 2 606 with respect to the page 4 662 of the memory block 2 562, and then, write and store the data segment 2 606 stored in the first buffer 510, in the next page of the page 4 662 in which the write fail occurs, that is, the page 5 664 of the memory block 2 562.

The controller 130 may write and store, in a spare region 1 670 in the page 6 668 of the memory block 2 562 in which the P2L segment 2 626 is stored, a segment information 1 672 for the meta segment 1 of the metadata stored in the memory block 2 562, in particular, the segment information 1 672 for the P2L segment 1 624 stored in the page 3 656 of the memory block 2 562. As described above, as an information on a position where the P2L segment 1 624 is stored, that is, the address information of the page 3 656 as a position information for the page 3 656 of the memory block 2 562, is included in the segment information 1 672 which is stored in the spare region 1 670 of the memory block 2 562, the controller 130 may manage the position information of the P2L segment 1 624 stored in the page 3 656 of the memory block 2 562, through the segment information 1 672 stored in the spare region 1 670 of the page 6 668. Also, by checking the segment information 1 672 stored in the spare region 1 670, the controller 130 may easily check the P2L segment 1 624 stored in the page 3 656 of the memory block 2 562. In particular, as a segment link is formed between the P2L segment 1 624 stored in the page 3 656 of the memory block 2 562 and the P2L segment 2 626 stored in the page 6 668 of the memory block 2 562 through the spare region 1 670 of the page 6 668, the controller 130 may easily manage and check the P2L segments 620 stored in the memory block 2 562. That is to say, the controller 130 may easily manage and check the meta segments of the metadata stored in the memory device 150, in particular, the P2L segments 620, through the segment link.

The P2L segment 2 626 for the data segment 2 606 may be stored, in the memory block 2 562, in the next normal page of the page 4 662 in which the data segment 2 606 is stored, that is, the page 6 668. Therefore, the page 6 668 in which the P2L segment 2 626 is stored may serve as a checkpoint indicating that the data segment 2 606 is completely stored in the memory block 2 562 of the memory device 150. The controller 130 may check, through the page 6 668 in which the P2L segment 2 626 is stored, that a write or program operation for the data segment 2 606 is normally completed, that is, a write success for the data segment 2 606.

The controller 130 may write and store the data segment 3 608 stored in the first buffer 510, in a page 7 674 included in the memory block 2 562. The controller 130 may generate and update a meta segment 3 of the metadata corresponding to the storage of the data segment 3 608 in the page 7 674 of the memory block 2 562, that is, the meta segment 3 for the data segment 3 608, and store the meta segment 3 in the second buffer 520 included in the memory 144 of the controller 130. In particular, the controller 130 may generate and update a P2L segment 3 628 for the data segment 3 608, and store the P2L segment 3 628 in the second buffer 520. The controller 130 may write and store the P2L segment 3 628 stored in the second buffer 520, in a page 8 676 included in the memory block 2 562.

The controller 130 may write and store, in a spare region 2 678 in the page 8 676 of the memory block 2 562 in which the P2L segment 3 628 is stored, a segment information 2 680 for the meta segment 3 of the metadata stored in the memory block 2 562, in particular, the segment information 2 680 for the P2L segment 2 626 stored in the page 6 668 of the memory block 2 562. As described above, as an information on a position where the P2L segment 2 626 is stored, that is, the address information of the page 6 668 as a position information for the page 6 668 of the memory block 2 562, may be included in the segment information 2 680 which is stored in the spare region 2 678 of the memory block 2 562, the controller 130 may manage the position information of the P2L segment 2 626 stored in the page 6 668 of the memory block 2 562, through the segment information 2 680 stored in the spare region 2 678 of the page 8 676. Also, by checking the segment information 2 680 stored in the spare region 2 678, the controller 130 may easily check the P2L segment 2 626 stored in the page 6 668 of the memory block 2 562. In particular, as a segment link is formed between the P2L segment 2 626 stored in the page 6 668 of the memory block 2 562 and the P2L segment 3 628 stored in the page 8 676 of the memory block 2 562 through the spare region 2 678 of the page 8 676, the controller 130 may easily manage and check the P2L segments 620 stored in the memory block 2 562. That is to say, the controller 130 may easily manage and check the meta segments of the metadata stored in the memory device 150, in particular, the P2L segments 620, through the segment link.

For example, the controller 130 may sequentially check, through the segment links formed in the memory block 2 562, the P2L segments 620 stored in the memory block 2 562. Namely, after checking the P2L segment 3 628 stored in the page 8 676, the controller 130 may check the P2L segment 2 626 stored in the page 6 668, through the segment information 2 680 stored in the spare region 2 678, check the P2L segment 1 624 stored in the page 3 656, through the segment information 1 672 stored in the spare region 1 670, and check the P2L segment 0 622 stored in the page 1 652, through the segment information 0 660 stored in the spare region 0 658.

The P2L segment 3 628 for the data segment 3 608 may be stored, in the memory block 2 562, in the next page of the page 7 674 in which the data segment 3 608 is stored, that is, the page 8 676. Therefore, the page 8 676 in which the P2L segment 3 628 is stored may serve as a checkpoint indicating that the data segment 3 608 is completely stored in the memory block 2 562 of the memory device 150. The controller 130 may check, through the page 8 676 in which the P2L segment 3 628 is stored, that a write or program operation for the data segment 3 608 is normally completed, that is, a write success for the data segment 3 608.

In this way, in the memory system according to the embodiment, after storing the data segments of user data corresponding to a command received from the host 102 are stored in the memory 144 of the controller 130, the data segments stored in the memory 144 are written and stored in the pages included in the memory blocks of the memory device 150. Moreover, the meta segments of metadata for the data segments, in particular, the P2L segments of second map data, are stored in pages which are located next to the pages where the corresponding data segments are stored. Segment information for the meta segments, in particular, information on positions where the P2L segments are stored in the memory blocks of the memory device 150, are written and stored in the spare regions of the next pages where the P2L segments are stored. Therefore, in the memory system according to an embodiment, use of additional memories for managing and storing the segment information of the meta segments, in particular, the position information of the P2L segments, is not needed. Also, generation and retention of additional data structure for the segment information of the meta segments are not needed. By forming segment links between the P2L segments stored in the memory blocks of the memory device, it is possible to more readily manage and check the P2L segments which are stored in the memory blocks of the memory device. In particular, in the memory system according to an embodiment of the present invention, in the case of checking the P2L segments stored in the memory blocks of the memory device 150, for example, in the case of checking the P2L segments according to occurrence of a sudden power-off or a write fail, the position information of the P2L segments are checked, and positions where the P2L segments are stored in the memory blocks of the memory device 150 are sequentially checked, through segment links. That is to say, the P2L segments stored in the memory blocks are sequentially checked through the segment links. As a result, it is possible to quickly check the P2L segments stored in the memory blocks of the memory device 150. Hereinbelow, an operation for processing data in a memory system according to an exemplary embodiment will be described below in detail with reference to FIG. 7.

Figure 7:
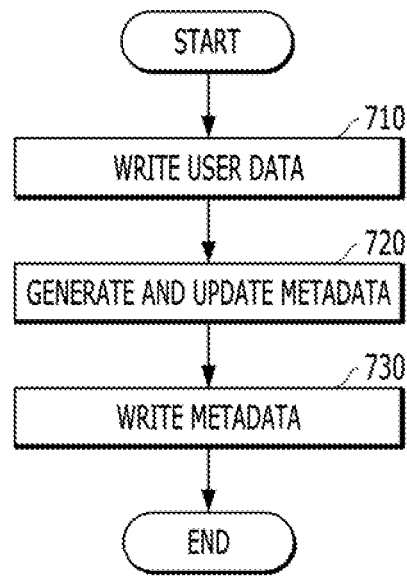
FIG. 7 is a flow chart of a data processing operation in a memory system according to an embodiment of the present invention.

FIG. 7 is a flow chart of a data processing operation in a memory system according to an embodiment of the present invention.

Referring to FIG. 7, the data processing operation may include writing the user data in a memory block of the memory device according to step 710. More specifically, after storing the data segments of user data corresponding to a command received from the host 102, in the memory 144 of the controller 130, at step 710 the data segments stored in the memory 144 may be written and stored in the pages included in one or more memory blocks of the memory device 150.

At step 720, in correspondence to the storage of the data segments stored in the memory 144, in the pages included in the one or more memory blocks of the memory device 150, the meta segments of metadata for the data segments may be generated and updated. The updated meta segments may be stored in the memory 144 of the controller 130. The meta segments of the metadata may include, as described above, the L2P segments of first map data and the P2L segments of second map data, for the data segments.

At step 730, the meta segments of the metadata stored in the memory 144 of the controller 130 may be written and stored in the pages included in one or more memory blocks of the memory device 150. The one or more memory blocks of the memory device 150 where the meta segments are written may be the same as the one or more blocks of the memory device where the user data are stored. Segment information for the meta segments, that is, position information indicating positions where the meta segments are stored, may be written and stored in spare regions in the pages included in the memory blocks of the memory device 150, in particular, the spare regions of pages in which the meta segments are stored. The data processing operation may include any of the steps as described in detail with reference to FIGS. 5 and 6.

In an embodiment, the data processing operation may include an operation of writing and storing user data received together with a write command from the host 102. The user data may be stored in one or more memory blocks of the memory device. The data processing operation may also include generating, updating and storing metadata for the user data. The metadata may include second map data, that may be stored in pages included in one or more memory blocks of the memory device. The storing of the metadata may include storing the segment information for the second map data, for example, the information on positions where the second map data are stored in the one or more memory blocks, in the spare regions of pages in which the second map data are stored. The one or more memory blocks where the user data are stored may be the same as the one or more memory blocks where the metadata are stored. For example, the data segments may be stored in first pages included in a first memory block among the one or more memory blocks, the meta segments may be stored in second pages included in the first memory block, and segment information for the meta segments may be stored in spare regions of the second pages.

Hereinbelow, detailed descriptions will be made with reference to FIGS. 8 to 13, for a data processing system and electronic appliances to which the memory system 110 including the memory device 150 and the controller 130 described above with reference to FIGS. 1 to 7, according to the embodiment, is applied.

Figure 8:
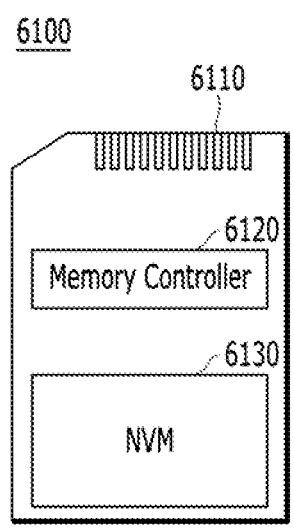
FIGS. 8 to 13 are diagrams schematically illustrating memory systems, according to various embodiments of the present invention.

FIG. 8 is a diagram illustrating a data processing system including the memory system according to the embodiment. FIG. 8 is a drawing schematically illustrating a memory card system to which the memory system according to an embodiment is applied.

Referring to FIG. 8, a memory card system 6100 includes a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, For example, a mobile electronic appliance.

The memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 9:
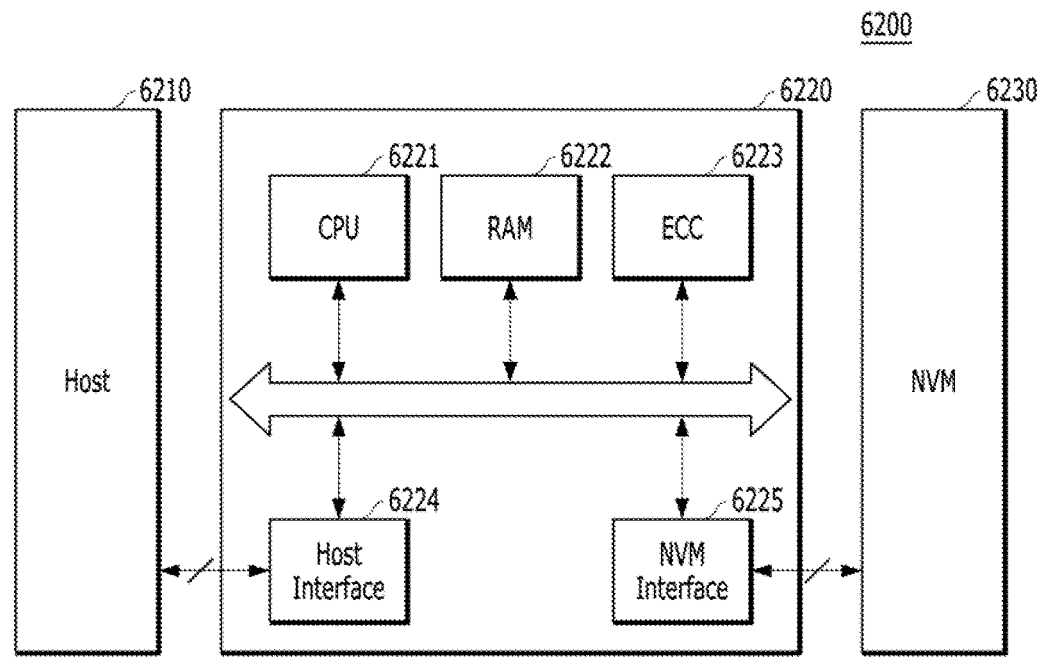

FIG. 9 is a diagram schematically illustrating an example of a data processing system including a memory system according to an embodiment of the present invention.

Referring to FIG. 9, a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, For example, a mobile electronic appliance.

Figure 10:
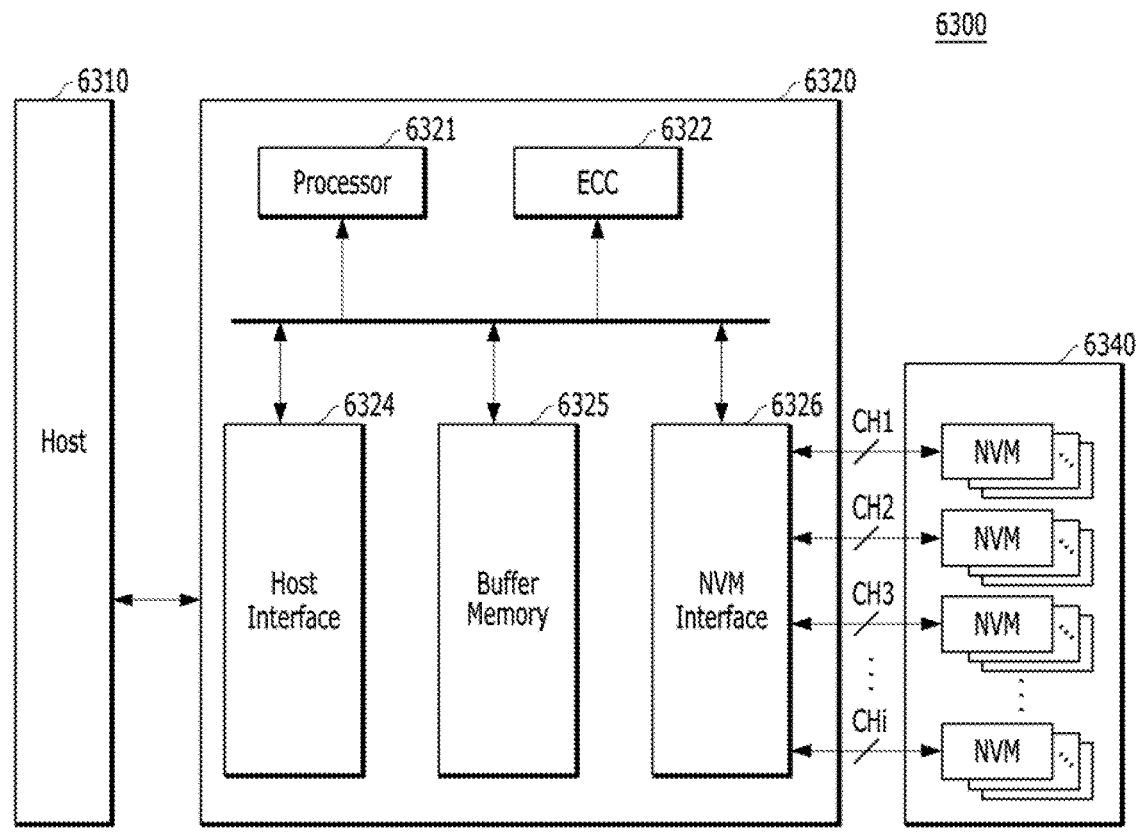

FIG. 10 is a diagram illustrating an example of a data processing system including a memory system according to an embodiment of the invention. FIG. 10 may be a solid state drive (SSD).

Referring to FIG. 10, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CH1. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340, or temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 10, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (For example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (For example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 11:
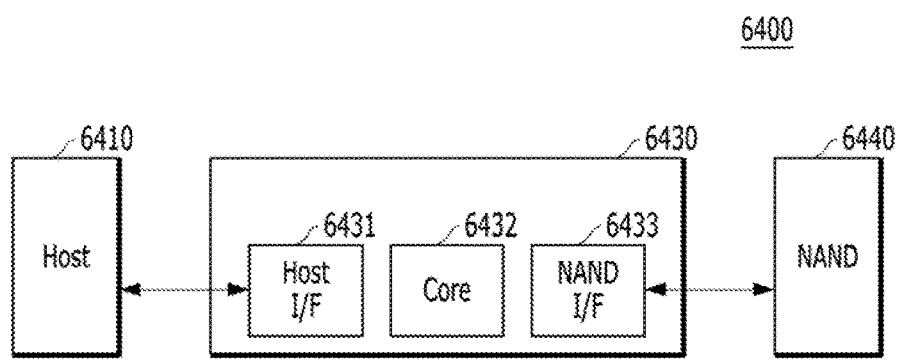

FIG. 11 is a diagram illustrating another example of a data processing system including the memory system according to an embodiment of the present invention. FIG. 11 is a drawing schematically illustrating an embedded multimedia card (eMMC) to which a memory system according to an embodiment is applied.

Referring to FIG. 11, an eMMC 6400 includes a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

In detail, the controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 12:
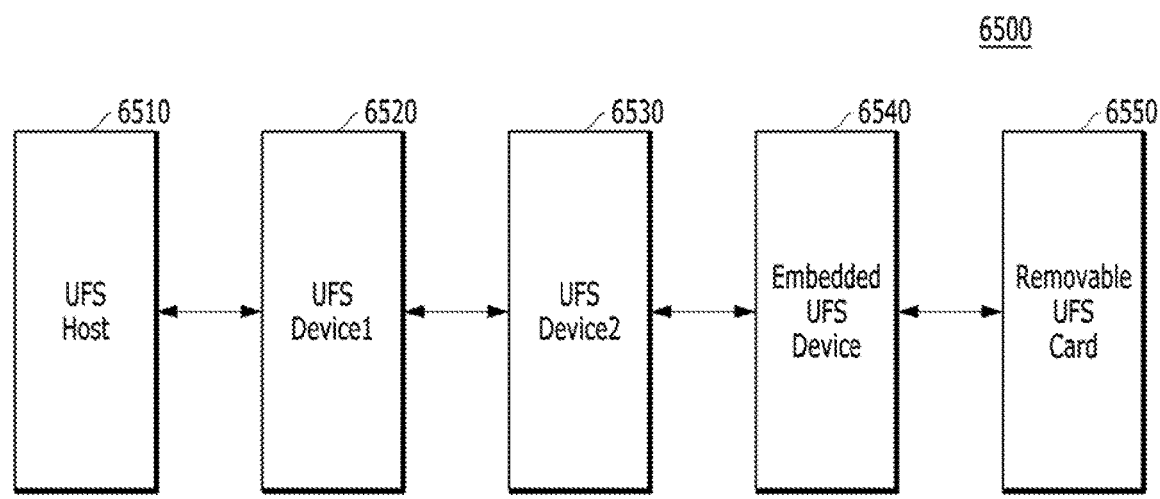

FIG. 12 is a diagram illustrating another example of a data processing system including a memory system according to an embodiment of the present invention. FIG. 12 is a drawing schematically illustrating a universal flash storage (UFS) to which the memory system according to the embodiment is applied.

Referring to FIG. 12, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 8. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 13:
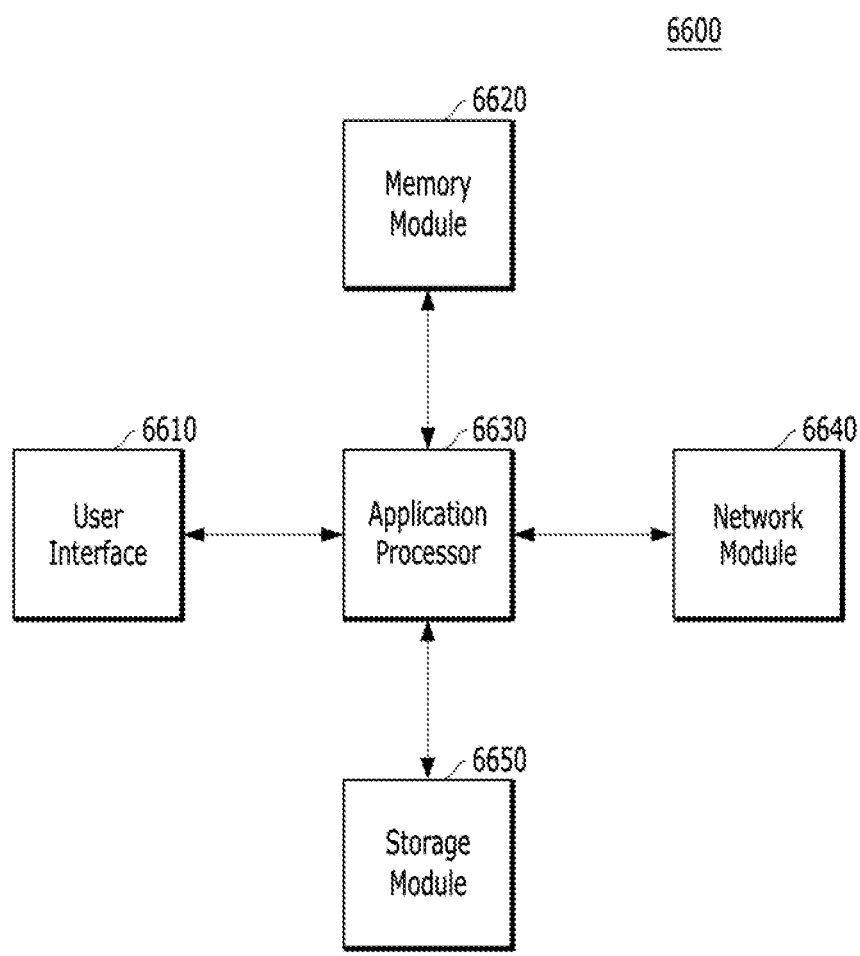

FIG. 13 is a diagram illustrating an example of a data processing system including the memory system according to an embodiment of the present invention. FIG. 13 is a drawing schematically illustrating a user system to which the memory system according to the embodiment is applied.

Referring to FIG. 13, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, For example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6630, and transmit data stored therein, to the application processor 6630. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 10 to 12.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to the described embodiments may reduce complexity and performance deterioration of the memory system and increase use efficiency of the memory device, thereby more quickly and stably process data with respect to the memory device.

Although various embodiments have been described for illustrative purposes, it will be apparent to those skilled in the art that various other changes and modifications may be made without departing from the spirit and scope of the invention as defined in the following claims.

What is claimed is:

1. A memory system comprising:
   a memory device including a plurality of memory blocks, each memory block including a plurality of pages, each page including a plurality of memory cells operatively coupled to a word line for storing data; and
   a controller including a memory, the controller being suitable for performing a command operation corresponding to a command entered from a host, and storing data segments of user data and meta segments of metadata for the command operation in the memory,
   wherein the controller individually stores at least one of the data segments and at least one of the meta segments associated with the at least one of the data segments in different pages of a single first memory block,
   wherein the at least one of the meta segments, which is stored in a single page, includes a meta segment and a segment link for engaging the meta segment with another meta segment stored in a different page, and wherein the controller stores a first data segment among the data segments, in a third page among first pages in the first memory block, and stores a first meta segment for the first data segment among the meta segments, in a fourth page next to the third page, among second pages in the first memory block.

2. The memory system according to claim 1, wherein the controller stores a second data segment among the data segments, in a fifth page next to the fourth page, and stores a second meta segment for the second data segment among the meta segments, in a sixth page next to the fifth page.

3. The memory system according to claim 2, wherein the controller stores a first segment information for the first meta segment, in a first spare region of the sixth page, among the spare regions.

4. The memory system according to claim 2, wherein, while storing the second meta segment in the sixth page, if a power-off occurs in the memory system and then the memory system is changed to a power-on state, the controller stores the second meta segment in a seventh page next to the sixth page.

5. The memory system according to claim 2, wherein, while storing the second data segment in the fifth page, if a power-off occurs in the memory system and then the memory system is changed to a power-on state, the controller stores the second data segment in the sixth page and stores the second meta segment in the seventh page next to the sixth page.

6. The memory system according to claim 2, wherein segment links are formed between the meta segments stored in the second pages, through the segment information stored in the spare regions of the second pages.

7. The memory system according to claim 6, wherein the controller sequentially checks the meta segments through the segment links.

8. The memory system according to claim 1, wherein the segment information includes position information of the second pages in which the meta segments are stored.

9. The memory system according to claim 1, wherein the second pages serve as checkpoints indicating that the data segments are completely stored in the first pages.

10. A method for operating a memory system, comprising:
receiving a command from a host for a plurality of pages which are included in each of a plurality of memory blocks of a memory device of the memory system;
performing a command operation corresponding to the command, between a controller of the memory device and the memory blocks;
storing data segments of user data and meta segments of metadata for the command operation, in a memory of the controller; and
individually storing at least one of the data segments and at least one of the meta segments associated with the at least one of the data segments in different pages of a single first memory block, wherein the at least one of the meta segments, which is stored in a single page, includes a meta segment and a segment link for engaging the meta segment with another meta segment stored in a different page,
wherein a first data segment among the data segments is stored in a third page among first pages in the first memory block, and a first meta segment for the first data segment among the meta segments is stored in a fourth page next to the third page among the second pages in the first memory block.

11. The method according to claim 10,
wherein the storing in the first pages comprises:
storing a second data segment among the data segments, in a fifth page next to the fourth page, and
wherein the storing in the second pages comprises:
storing a second meta segment for the second data segment among the meta segments, in a sixth page next to the fifth page.

12. The method according to claim 11, wherein the storing in the spare regions comprises:
storing a first segment information for the first meta segment, in a first spare region of the sixth page, among the spare regions.

13. The method according to claim 11, further comprising:
storing the second meta segment in a seventh page next to the sixth page, if a power-off occurs in the memory system while storing the second meta segment in the sixth page and then the memory system is changed to a power-on state.

14. The method according to claim 11, further comprising:
storing the second data segment in the sixth page and storing the second meta segment in the seventh page next to the sixth page, if a power-off occurs in the memory system while storing the second data segment in the fifth page and then the memory system is changed to a power-on state.

15. The method according to claim 11, wherein segment links are formed between the meta segments stored in the second pages, through the segment information stored in the spare regions of the second pages.

16. The method according to claim 15, further comprising:
sequentially checking the meta segments through the segment links.

17. The method according to claim 10, wherein the segment information includes position information of the second pages in which the meta segments are stored.

18. The method according to claim 10, wherein the second pages serve as checkpoints indicating that the data segments are completely stored in the first pages.

* * * * *